United States Patent [19]

Okumura

[11] Patent Number: 5,012,179

[45] Date of Patent: Apr. 30, 1991

[54] FLYBACK TRANSFORMER WITH INTEGRALLY FORMED RESONANCE CAPACITOR

[75] Inventor: Mitunao Okumura, Nagaokakyo, Japan

[73] Assignee: Murata Manufacturing Co., Ltd., Japan

[21] Appl. No.: 365,773

[22] Filed: Jun. 14, 1989

[30] Foreign Application Priority Data

Jun. 15, 1988 [JP] Japan ................................ 63-147534
Jun. 16, 1988 [JP] Japan ................................ 63-148585

[51] Int. Cl.[5] ........................ H01F 15/14; H04N 3/195

[52] U.S. Cl. .................................... 323/355; 315/411; 336/69; 336/180; 336/211; 363/126

[58] Field of Search ................. 336/69, 180, 182, 183, 336/200, 211, 232; 323/355; 363/126, 68; 315/411

[56] References Cited

U.S. PATENT DOCUMENTS

| | | | |
|---|---|---|---|
| 3,210,705 | 10/1965 | Lockie | 336/69 |
| 3,223,923 | 12/1965 | Howell | 323/355 |
| 3,704,390 | 11/1972 | Grahame | 336/69 |
| 3,894,270 | 7/1975 | Manske | 336/69 |
| 4,007,416 | 2/1977 | Szatmari | 336/96 |
| 4,635,019 | 1/1987 | Akachi et al. | 336/180 |

FOREIGN PATENT DOCUMENTS

| | | | |
|---|---|---|---|
| 792397 | 8/1968 | Canada | 336/69 |
| 224405 | 10/1986 | Japan | 323/355 |

*Primary Examiner*—William H. Beha, Jr.
*Attorney, Agent, or Firm*—Ostrolenk, Faber, Gerb & Soffen

[57] ABSTRACT

A flyback transformer includes a film wound unit which is composed of a first and second film sheets on which a first and second conductors are formed. A primary coil is formed by the first conductor, and a resonance capacitor which is connected to the primary coil is formed between the first and second conductors. A plurality of secondary coils are sequentially formed, and rectifying diodes are respectively connected between the respective secondary coils. Each of the secondary coils may be a metal plating coil.

12 Claims, 11 Drawing Sheets

FLYBACK TRANSFORMER WITH INTEGRALLY FORMED RESONANCE CAPACITOR

BACKGROUND OF THE INVENTION

1. Field of the Invention

The present invention relates to a flyback transformer. More specifically, the present invention relates to a flyback transformer included in a horizontal deflection circuit for a cathode ray tube (CRT) which is utilized in a television receiver, for example.

2. Description of the Prior Art

As shown in FIG. 1, a horizontal deflection circuit includes a flyback transformer 1 which includes a primary coil PC and a plurality of secondary coils SC1 through SC4 which are magnetically coupled to the primary coil PC, and rectifying diodes D1 through D4 are connected between the respective secondary coils SC1 through SC4. A horizontal pulse generation circuit 2 is connected to the primary coil PC, which is constructed from a transistor Tr, a damper diode Dd, a resonance capacitor Cp, a direct current power source E, and so on.

FIG. 2A and FIG. 2B shows one example of a conventional flyback transformer 1, wherein the secondary coils SC1 through SC4 are divided and wound on a bobbin with flange 3 (section winding). In a flyback transformer 1 shown in FIG. 3A and FIG. 3B, the respective secondary coils SC1 through SC4 are sequentially wound on the primary coil PC in a laminated fashion (plane winding).

Since a film capacitor (1,000–6,000 pF) is utilized as the resonance capacitor Cp in the horizontal deflection circuit shown in FIG. 1, there is the problem that a large space is required and, since the resonance capacitor Cp is connected to the flyback transformer 1 as a discrete component, there is the further problem that productivity is low.

In addition, in either type of the flyback transformer as shown in FIG. 2A and FIG. 2B or FIG. 3A and FIG. 3B, since the secondary coils SC1 through SC4 are disposed on the primary coil PC, only inside portions of the secondary coils are close to the primary coil PC and an outside portion thereof is apart from the primary coil PC. Therefore, magnetic flux is leaked from the outside portion of the secondary coils, and therefore, the secondary leakage inductance becomes large. Therefore, in the conventional flyback transformer 1, voltage regulation which is a function of a vector sum of the secondary leakage inductance and a secondary resistance component is large. In addition, ringing occurs due to undesired resonance between the stray capacitance, between the primary coil and the secondary coil and the secondary leakage inductance, and therefore, there is the further problem that a striped pattern occurs on a screen of a television receiver.

SUMMARY OF THE INVENTION

Therefore, a principal object of the present invention is to provide a novel flyback transformer.

Another object of the present invention is to provide a flyback transformer which is compact and with which an increase of productivity can be expected.

Another object of the present invention is to provide a flyback transformer which incorporates a resonance capacitor.

Another object of the present invention is to provide a flyback transformer capable of decreasing the secondary leakage inductance and thus voltage regulation so as to prevent ringing from occurring.

Another object of the present invention is to provide a flyback transformer having good reliability.

A flyback transformer in accordance with the present invention comprises: a wound unit in which a first longitudinal insulation sheet and a second insulation sheet laminated on the first insulation sheet are wound, a first conductor being formed on one surface of said first insulation sheet and extended in a longitudinal direction thereof, two first terminals being fixed on said first conductor, a second conductor being formed on one surface of said second insulation sheet, a second terminal being fixed to said second conductor, a primary coil being formed between the two first terminals by said first conductor, and a resonance capacitor connected to the primary coil being formed between said first and second conductors; and a secondary coil disposed on the wound unit.

In accordance with the present invention, it is possible to incorporate the resonance capacitor in the flyback transformer in a one-piece fashion, in comparison with the case where the resonance capacitor is constituted by a separate film capacitor as in a conventional flyback transformer. Thus, the horizontal deflection circuit becomes compact as a whole and productivity thereof increases. In addition, since the resonance capacitor is incorporated in the flyback transformer, it is possible to suitably set a pulse width, output voltage and so on without any additional components, and therefore, adjustment of the flyback transformer when mounting the same into a television receiver becomes simple.

In addition, a further flyback transformer in accordance with the present invention comprises: first and second primary coils connected in parallel to each other; and a secondary coil sandwiched between the first and second primary coils. In this flyback transformer, the secondary coil is sandwiched by the first and second primary coils which are divided. Therefore, since both sides of the secondary coil can be close to the primary coils, magnetic coupling between the primary coils and the secondary coil becomes close, and secondary leakage magnetic flux decreases and thus the secondary leakage inductance also decreases. Therefore, it is possible to make the voltage regulation small and to prevent ringing from occurring, and therefore, the picture image of a television receiver using such a flyback transformer becomes stable.

A still further flyback transformer in accordance with the present invention comprises: a primary coil including an insulation bobbin and a conductor formed on a peripheral surface of the insulation bobbin in a spiral fashion; and a secondary coil including an insulation bobbin and a conductor formed on a peripheral surface of the insulation bobbin in a spiral fashion, said first and second coils being disposed in a laminated fashion. In accordance with this flyback transformer, since the insulation bobbin is inserted between adjacent coil layers, no short-circuit occurs between the layers and, since the conductors of the respective coils are regularly formed on the insulation bobbins in a spiral fashion, no short-circuit occurs between windings or conductors. Therefore, in comparison with a transformer in which a conductive wire is wound, reliability drastically increases. In addition, since it is possible to easily obtain the primary and secondary coils by forming conductors on the peripheral surfaces of the insulation bobbins in a spiral fashion, mass-production becomes possible and, since it is possible to manufacture a flyback transformer only by disposing such coils in a laminated fashion, productivity increases in comparison with a conventional flyback transformer of a type in which a conductive wire is wound.

Another flyback transformer in accordance with the present invention comprises: a first primary coil including an insulation bobbin and a conductor formed on a peripheral surface thereof in a spiral fashion; a secondary coil which includes an insulation bobbin and a conductor formed on a peripheral surface thereof in a spiral fashion, which is disposed on the first primary coil in a laminated fashion; and at least one further primary coil which includes an insulation bobbin and a conductor formed on a peripheral surface thereof in a spiral fashion, which is disposed on the secondary coil in a laminated fashion and is connected to the first primary coil in parallel or in serial. In accordance with this flyback transformer, similarly to the previous one, the secondary leakage inductance can be decreased.

These objects and other objects, features, aspects and advantages of the present invention will become more apparent from the following detailed description of the embodiments of the present invention when taken in conjunction with accompanying drawings.

BRIEF DESCRIPTION OF THE DRAWINGS

FIG. 2A and FIG. 2B are illustrative views showing a structure of a conventional flyback transformer of a section winding type, wherein FIG. 2A is a partially cut-away front view thereof and FIG. 2B is a partially omitted right side view thereof.

FIG. 3A and FIG. 3B are illustrative views showing a structure of a conventional flyback transformer of a plane winding type, wherein FIG. 3A is a partially cut-away front view thereof and FIG. 3B is a partially omitted right side view thereof.

FIG 5A and FIG. 5B are illustrative views showing a structure of a flyback transformer of the embodiment of FIG. 4, wherein FIG. 5A is a partially cut-away front view thereof and FIG. 5B is a partially omitted right side view thereof.

FIG. 8A and FIG. 8B are illustrative views showing a film wound unit, wherein FIG. 8A is a partially cut-away front view thereof and FIG. 8B is a right side view thereof.

FIG. 9A and FIG. 9B are illustrative views showing a metal plating coil which is utilized as a secondary coil, wherein FIG. 9A is a front view thereof and FIG. 9B is a side view thereof.

FIG. 12A and FIG. 12B are illustrative views showing a structure of a flyback transformer of the embodiment of FIG. 11, wherein FIG. 12A is a partially cut-away front view thereof and FIG. 12B is a partially omitted right side view thereof.

FIG. 14A and FIG. 14B are illustrative views showing a structure of a flyback transformer of the embodiment of FIG. 13, wherein FIG. 14A is a partially cut-away front view thereof and FIG. 14B is a partially omitted right side view thereof.

FIG. 16A and FIG. 16B are illustrative views showing a structure of the embodiment, wherein FIG. 16A is a partially cut-away front view thereof and FIG. 16B is a partially omitted right side view thereof.

FIG. 17A and FIG. 17B are illustrative view showing a metal plating coil which is utilized as a primary coil, wherein FIG. 17A is a front view thereof and FIG. 17B is a side view thereof.

FIG. 19A and FIG. 19B are illustrative views showing a flyback transformer of the embodiment of FIG. 18, wherein FIG. 19A is a partially cut-away front view thereof and FIG. 19B is a partially omitted right side view thereof.

FIG. 21A and FIG. 21B are illustrative views showing a structure of a flyback transformer of the embodiment of FIG. 20, wherein FIG. 21A is a partially cut-away front view thereof and FIG. 21B is a partially omitted right side view thereof.

DETAIL DESCRIPTION OF THE PREFERRED EMBODIMENTS

Figure 5A:
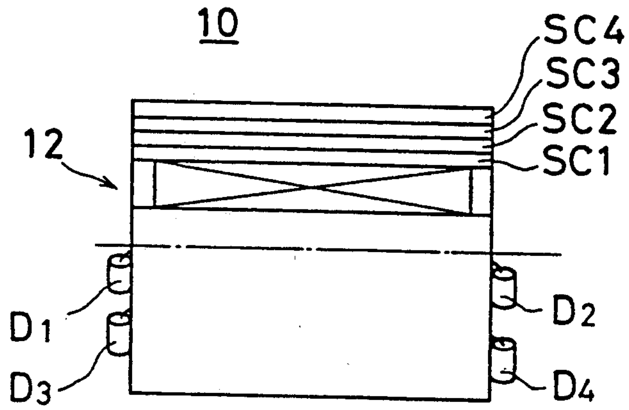
Figure 5B:
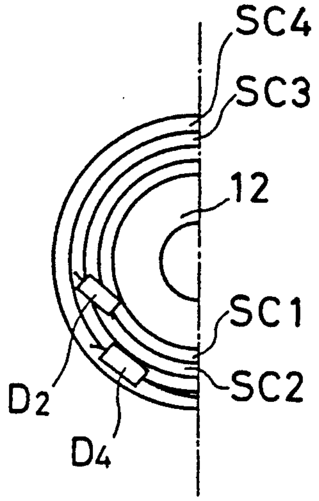
Figure 6:
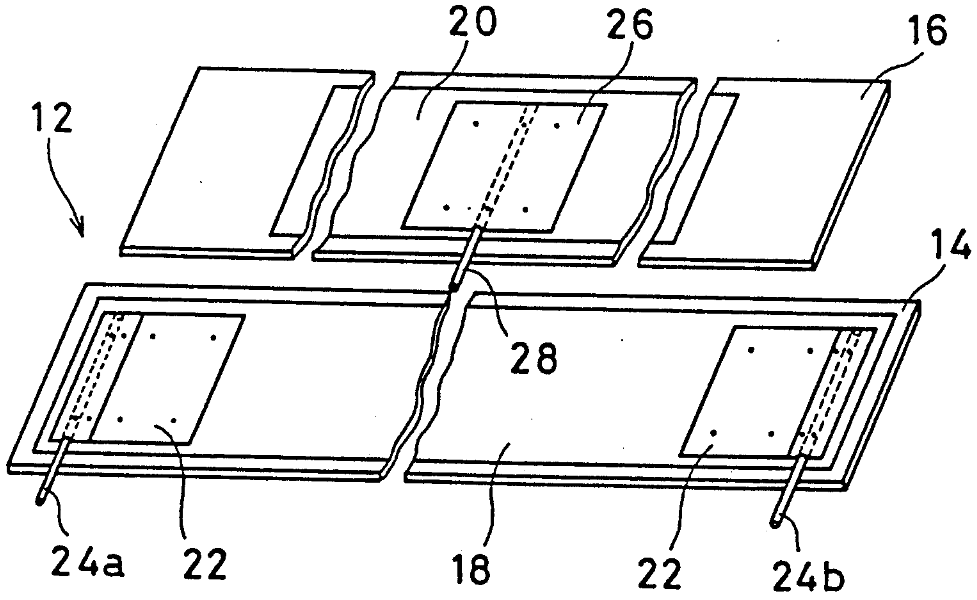
FIG. 6 is a perspective view showing the insulation sheets which constitute the film wound unit of the embodiment of FIG. 4, partially disassembled and exploded.

With reference to FIG. 5A and FIG. 5B, a flyback transformer 10 of this embodiment includes a film wound unit 12. The film wound unit 12, as shown in FIG. 6, includes a first and second longitudinal insulation sheets 14 and 16 each of which is made of an insulation material such as polyester film. On an upper surface of the insulation sheet 14, foil or leaf conductor 18 which is a foil or leaf made of a metal having good electrical conductivity such as aluminum or copper is adhered in a manner that the conductor 18 is continuously extended in a longitudinal direction thereof. A foil or leaf conductor 20 which is made of the same or similar material as that of the conductor 18 is adhered on the second insulation sheet 16.

In addition, the first and second conductors 18 and 20 can be formed by means of vacuum evaporation, metal plating, or the like.

First terminals 24*a* and 24*b* are fixed on the first conductor 18 at both ends thereof, respectively, by fixing further foil or leaf conductors 22 each of which is made of a metallic foil or leaf onto the conductor 18 by means of spot welding. More specifically, each of the first terminals 24*a* and 24*b* is sandwiched by a portion of each of the conductors 22 where an end portion of the conductor 22 having a rectangular shape is folded-back and welded by means of spot welding, and therefore, each of the first terminals 24a and 24b is integrated with each of the conductors 22 and fixed to the conductor 18. In addition, a second terminal 28 is fixed on the second conductor 20 on the second insulation sheet 16 at approximately the center thereof in a longitudinal direction by a further foil or leaf conductor 26 in the same or a similar way. That is, the second terminal 28 is sandwiched between the second conductor 20 and the conductor 26 and integrated and fixed by means of spot welding, for example.

Figure 7:
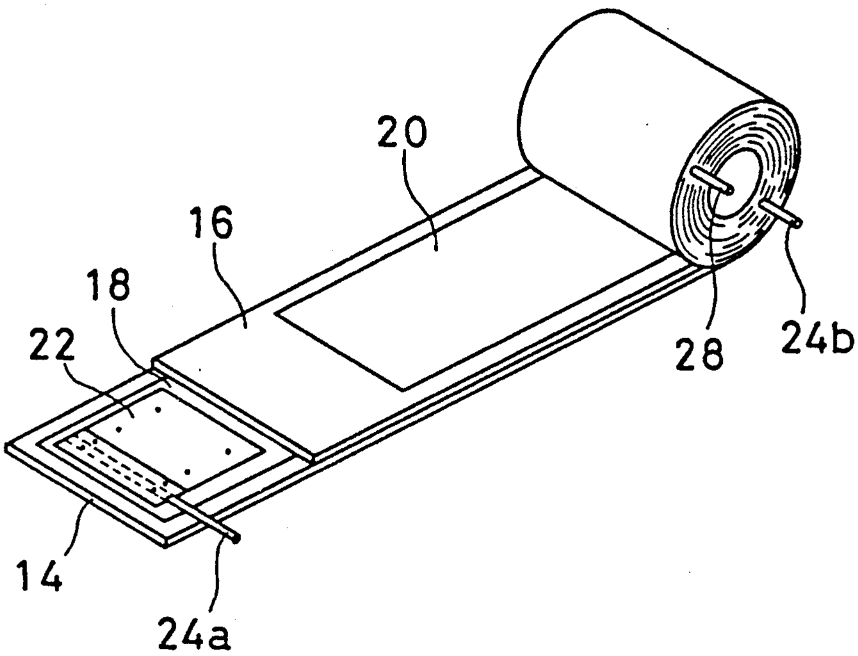
FIG. 7 is an illustrative view showing the film wound unit being produced by laminating the first and second insulation sheets shown in FIG. 6.

A film wound unit 12 is formed by winding the first and second insulation sheets 14 and 16 thus formed in a cylindrical manner such that the second conductor 20 on the second insulation film sheet 16 is toward the inside when the first and second insulation sheets 14 and 16 are laminated, as shown in FIG. 7.

Figure 8A:
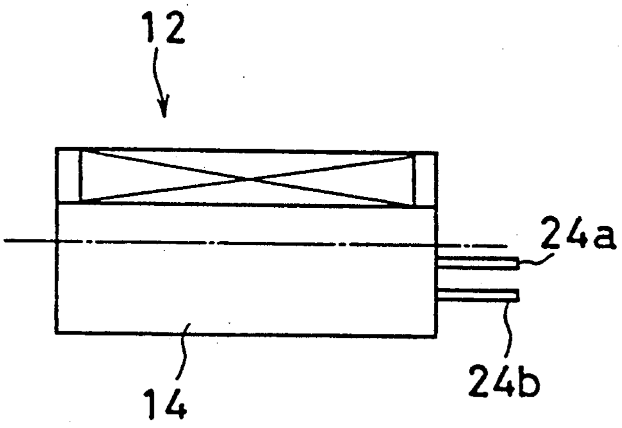
Figure 8B:
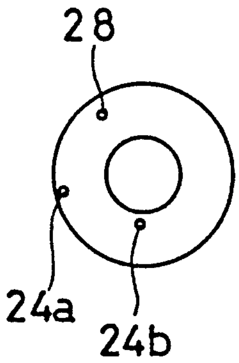

In such a wound unit 12, as shown in FIG. 8A and FIG. 8B, the first terminals 24a and 24b and the second terminal 28 are respectively exposed at one end surface of the wound unit 12.

Figure 4:
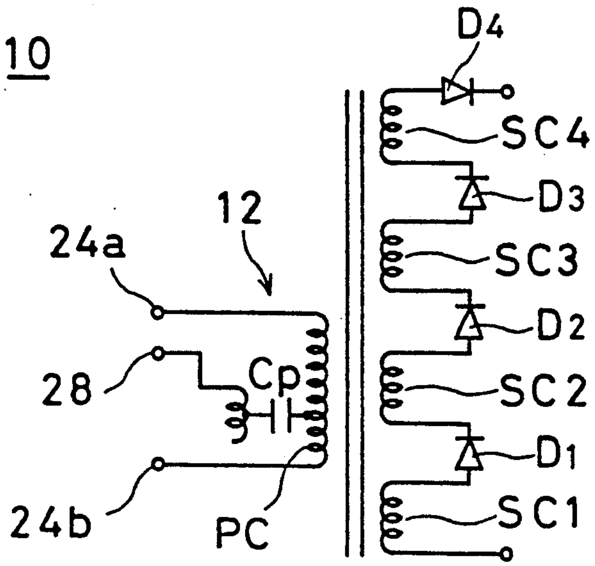
FIG. 4 is a circuit diagram showing a flyback transformer of one embodiment in accordance with the present invention.

A primary coil PC as shown in the equivalent circuit of FIG. 4 is formed by the first conductor 18 between the first terminals 24a and 24b. Therefore, the distance between these first terminals 24a and 24b affects the inductance of the primary coil PC. Therefore, by changing the fixing positions of the first terminals 24a and 24b, the value of the inductance of the primary coil PC can be suitably adjusted.

If the first conductor 18 is divided in the width direction thereof into a plurality of strip parallel conductors and such strip parallel conductors are connected between the first terminals 24a and 24b in a serial fashion, the inductance of the primary coil PC can have a larger value. Thus, it is possible to control the number of turns of the primary coil (inductance) and stray capacitance.

Figure 1:
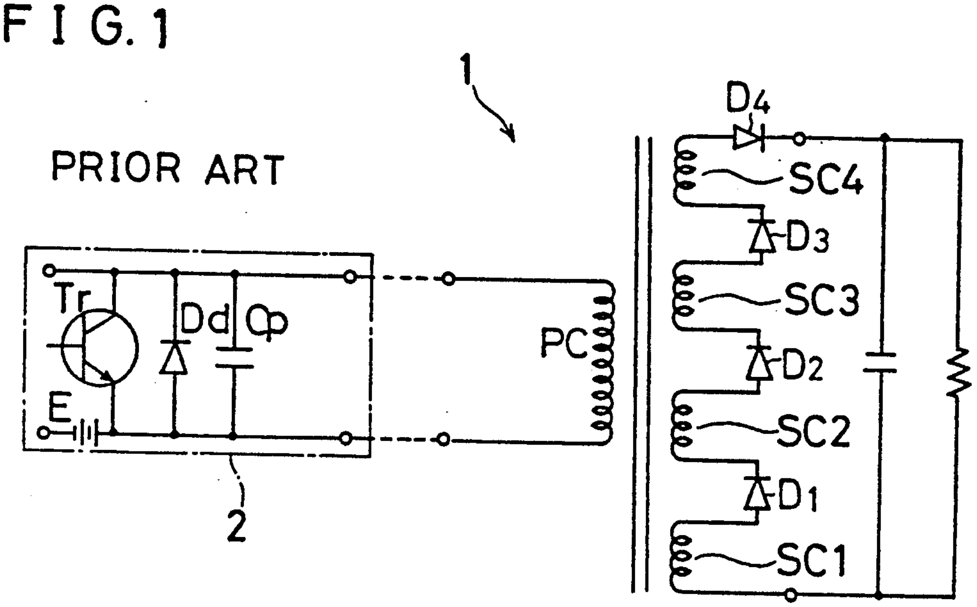
FIG. 1 PRIOR ART
FIG. 1 is a circuit diagram showing a conventional horizontal deflection circuit.
Figure 2A:
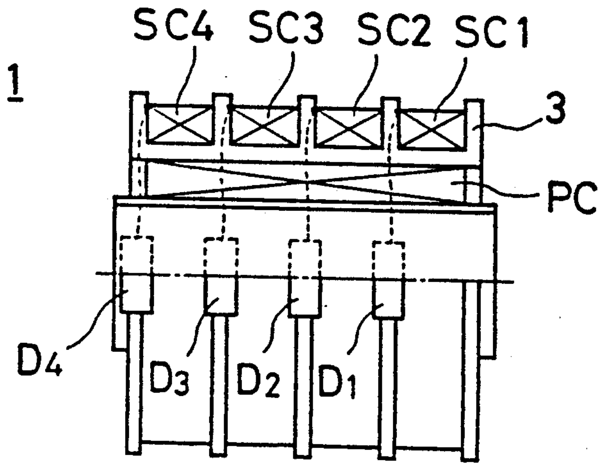
FIG. 2A PRIOR ART
Figure 2B:
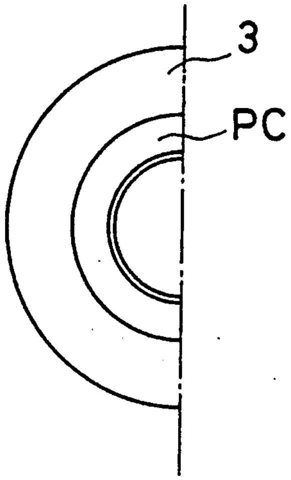
FIG. 2B PRIOR ART
Figure 3A:
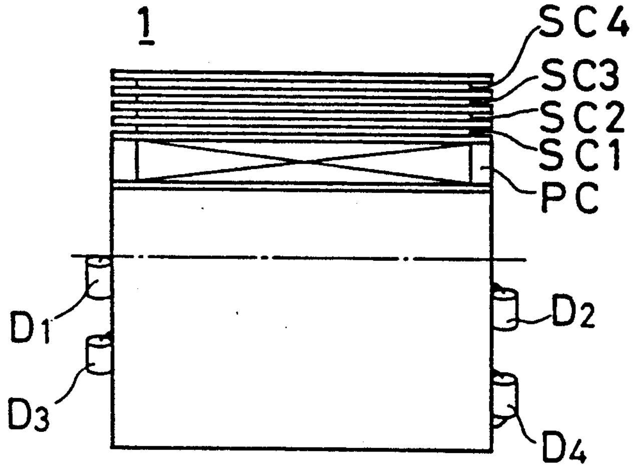
FIG. 3A PRIOR ART
Figure 3B:
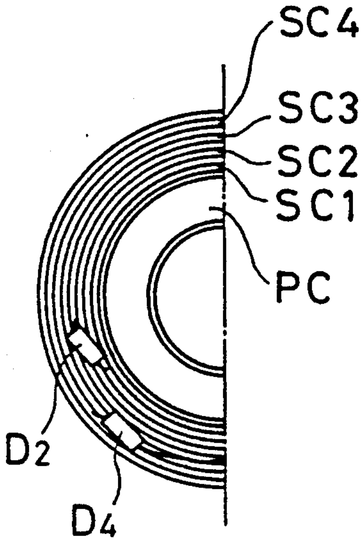
FIG. 3B PRIOR ART

In addition, in the film wound unit 12, since the second insulation sheet 16 which-is a dielectric member is inserted between the first and second conductors 18 and 20, static capacitance is formed between the conductors 18 and 20. This static capacitance functions as the resonance capacitor Cp shown in FIG. 1. More specifically, one electrode of the resonance capacitor Cp which is formed by the first and second conductors 18 and 20 is connected to the second terminal 28 and the other electrode thereof is connected to the primary coil PC. Therefore, if the first terminals 24a and the second terminal 28 are connected to each other in an external circuit (or internal circuit), the resonance capacitor Cp is connected in parallel to the primary coil PC. The capacitance value of the resonance capacitor Cp can be suitably adjusted in accordance with an area where the first and second conductors 18 and 20 face each other, or and in accordance with a dielectric constant of the second insulation sheet 16.

In addition, the second conductor 20 which constitutes the resonance capacitor Cp, of course, has an inductance component as shown in FIG. 4; however, it is desired that such inductance be reduced as possible. To that end, the second terminal 28 may be fixed at a center of the second conductor 20 in a longitudinal direction. Thus, unnecessary parasitic inductance of the resonance capacitor Cp can be reduced because the magnetic flux generated by the currents flowing in opposite directions offset each other. The currents flow in opposite directions, that is, leftward and rightward from the second terminal 28 which is at the center of the second conductor 20.

Returning to FIG. 5A and FIG. 5B, the secondary coils SC1 through SC4 are disposed on the aforementioned film wound unit 12 in a laminated fashion.

Figures 9A, 9B:
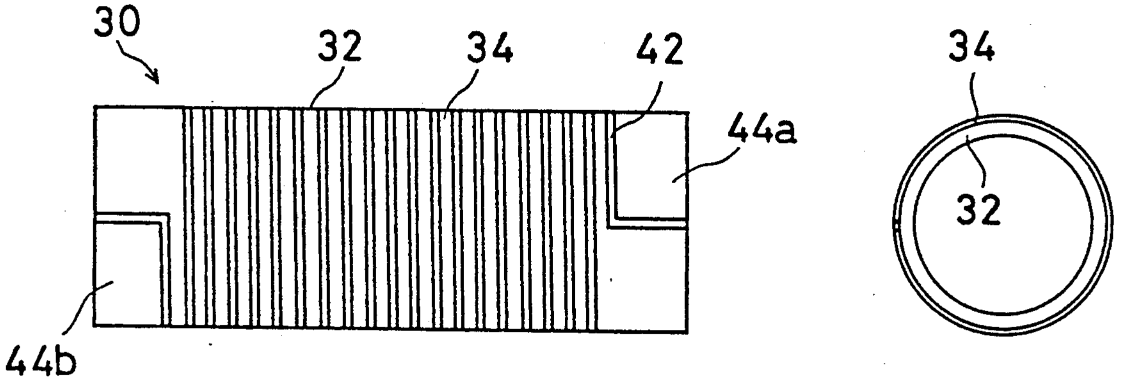
Figure 10:
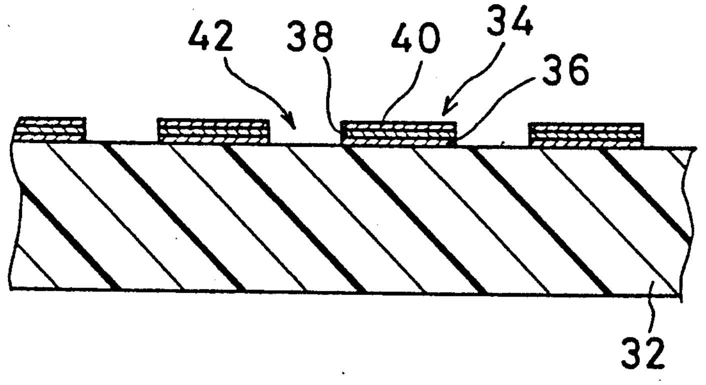
FIG. 10 is a cross-sectional view showing a metal plating coil shown in FIG. 9 in an enlarged manner.

As each of the secondary coils SC1 and SC4, preferably, a metal plating coil 30 as shown in FIG. 9A and FIG. 9B is used. The metal plating coil 30 includes a hollow bobbin 32 which is formed as a hollow cylindrical member made of an insulation resin such as a Noryl polycarbonate, polyimide or the like, and a spiral conductor 34 is formed on an outer peripheral surface of the bobbin 32. The conductor 34 has a 3-layered structure in which a non-electrolytic plating layer 36 of nickel, an electrolytic plating layer 38 of copper and an electrolytic plating layer 40 of chromium are laminated. Such a spiral conductor 34 is formed by forming the conductor 34 composed of the 3-layered structure as shown in FIG. 10 on a whole surface of the outer peripheral surface of the bobbin 32 and thereafter forming spiral slit 42 by means of a laser or the like. In addition, a starting end portion and a terminating end portion of the conductor 34 are used as connecting terminals 44a and 44b, respectively.

By preparing 4 kinds of metal plating coils 30, bobbin diameters of which are different from each other, and by sequentially inserting the metal plating coils 30 on the film wound unit 12, the flyback transformer 10 as shown in FIG. 4, FIG. 5A and FIG. 5B is obtained.

Then, as shown in FIG. 4, FIG. 5A and FIG. 5B, by utilizing above described connecting terminals 44a and 44b, rectifying diodes D1 through D4 are connected between the respective secondary coils SC1 through SC4, respectively.

In addition, in the above described embodiment, the metal plating coils 30 are utilized as secondary coils SC1 through SC4; however, it goes without saying that secondary coils similar to conventional coils as shown in FIG. 2A and FIG. 2B or FIG. 3A and FIG. 3B may be wound on the film wound unit 12.

In the flyback transformer 10 thus obtained, since it is possible to incorporate the resonance capacitor Cp as well as the primary coil PC in the film wound unit 12, in comparison with a case where a discrete film capacitor is utilized, it is possible to save space, and productivity thereof increases since the manufacturing steps become simple.

In addition, if the values of the inductance of the primary coil PC and the capacitance of the resonance capacitor Cp are suitably set in advance in the film wound unit 12, when incorporating the flyback transformer 10 in a television receiver, it is not necessary to adjust a pulse width and an output voltage, which is conducive to increase of the productivity of the television receivers.

Figure 11:
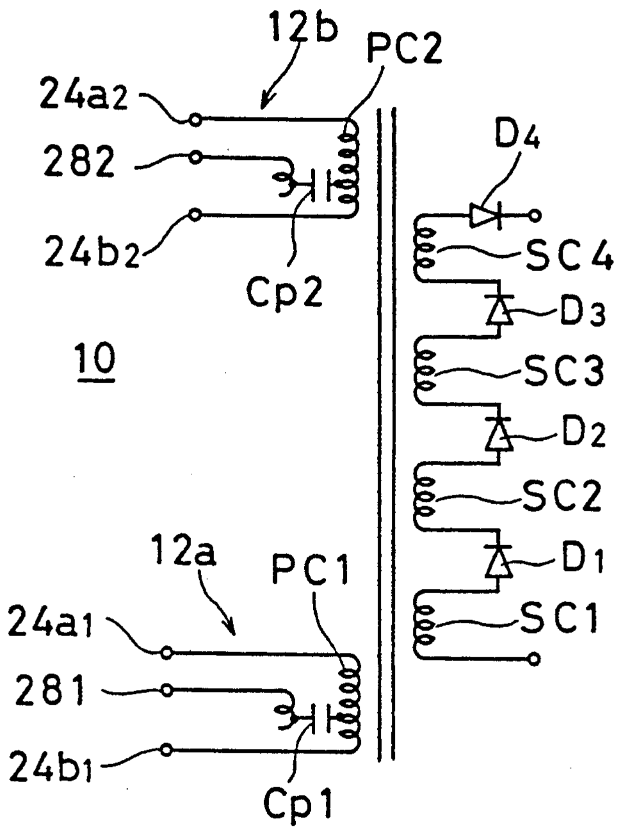
FIG. 11 is a circuit diagram showing a flyback transformer of another embodiment in accordance with the present invention.

Next, with reference to FIG. 11, a flyback transformer 10 of this embodiment, includes two film wound units 12a and 12b. Since the film wound units 12a and 12b are constructed in the same or a similar way as the film wound unit 12 shown in FIG. 6, a detailed description thereof will be omitted here.

Figure 12A:
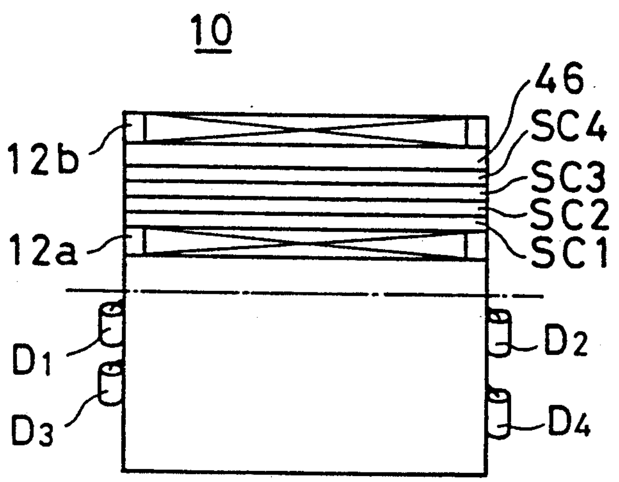
Figure 12B:
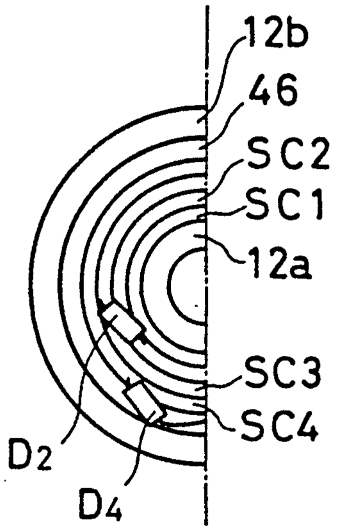

As shown in FIG. 12A and FIG. 12B, first, the film wound unit 12a is prepared. The secondary coils SC1 through SC4 are sequentially disposed thereon in a laminated fashion. As the secondary coils SC1 through SC4, the metal plating coils 30 shown by FIG. 9A and FIG. 9B are utilized. Thereafter, an insulation sheet 46 is wound on the uppermost secondary coil SC4 and the film wound unit 12*b* is further formed on the insulation sheet 46.

In addition, it is to be noted that in order to avoid complication of the drawings, the first and second terminals of the respective film wound units are not illustrated in FIG. 12A and FIG. 12B likewise FIG. 5A and FIG. 5B (previously described) and FIG. 14A and FIG. 14B (described later).

In the flyback transformer 10, by connecting the first terminals 24*a*1 and 24*a*2 shown in FIG. 11 to each other, by connecting the first terminals 24*b*1 and 24*b*2 to each other, and by connecting the second terminals 281 and 282 to the first terminals 24*a*1 and 24*a*2, respectively, the two primary coils PC1 and PC2 are connected in parallel to each other and resonance capacitors Cp1 and Cp2 are also connected in parallel to each other. In this case, the current capacity of each of the primary coils PC1 and PC2 may be ½ of that of the previous embodiment.

In addition, a casing is mounted outside primary coil PC. Part of such, a casing may be made of a resin as in a conventional or may be transformer made of a metal. The reason why a metallic casing can be utilized is that the outermost surface layer is a primary coil to which a low voltage is applied and, if such a metallic casing is utilized, a shielding effect takes place and is conducive to preventing noise such as spurious radiation.

Figure 15:
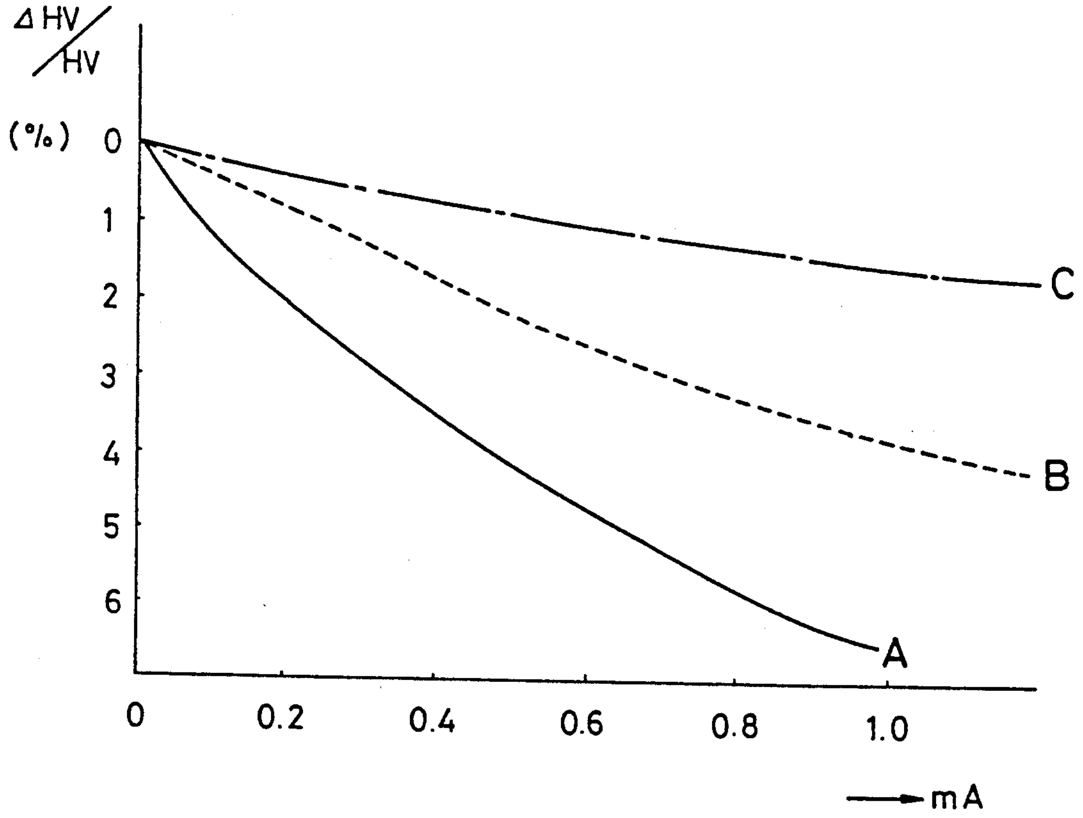
FIG. 15 is a graph showing voltage regulation in the respective embodiments.

In the embodiment shown in FIG. 11, FIG. 12A and FIG. 12B, since the secondary coils SC1 through SC4 are sandwiched by the two film wound units 12*a* and 12*b*, that is, the primary coils PC1 and PC2, magnetic coupling between the primary coils PC1 and PC2 and the secondary coils SC1 through SC4 becomes close. Therefore, it is possible to reduce the secondary leakage magnetic flux, that is, secondary leakage inductance. Therefore, in this embodiment, it is possible to improve the voltage regulation as shown by a line B in FIG. 15. Meanwhile, a line A in FIG. 15 shows the voltage regulation of the example where the secondary coils SC1 through SC4 are not sandwiched by the primary coils as in the embodiment shown in FIG. 4, FIG. 5A and FIG. 5B, as well as in the conventional transformer. In addition, since it is possible to reduce the secondary leakage inductance as described above, it is possible to prevent ringing due to resonance by such inductance and the stray capacitance.

Figure 13:
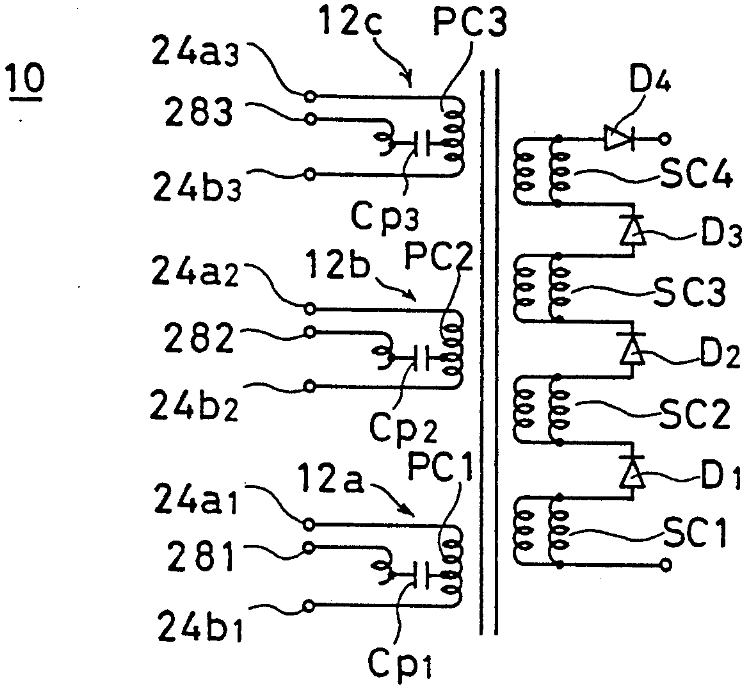
FIG. 13 is a circuit diagram showing a flyback transformer of a further embodiment in accordance with the present invention.

Next, with reference to FIG. 13, a flyback transformer 10 of this embodiment includes three film wound units 12*a*, 12*b* and 12*c*. Since the film wound units 12*a*, 12*b* and 12*c* can be constructed in the same or a similar way as the film wound unit 12 shown in FIG. 6, a detailed description thereof will be omitted here.

Figure 14A:
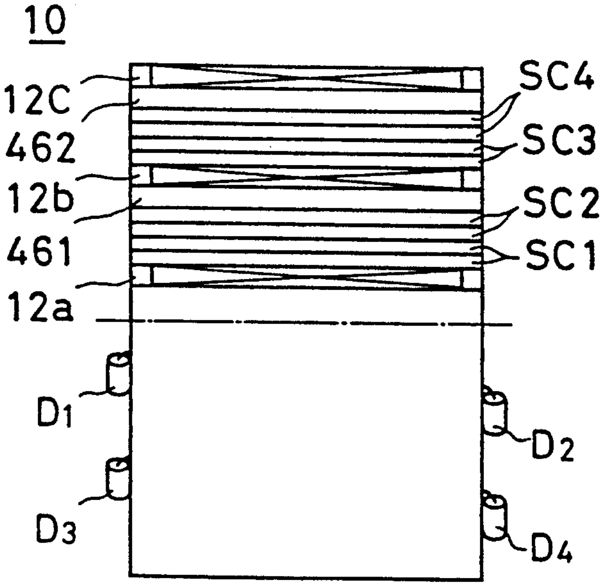
Figure 14B:
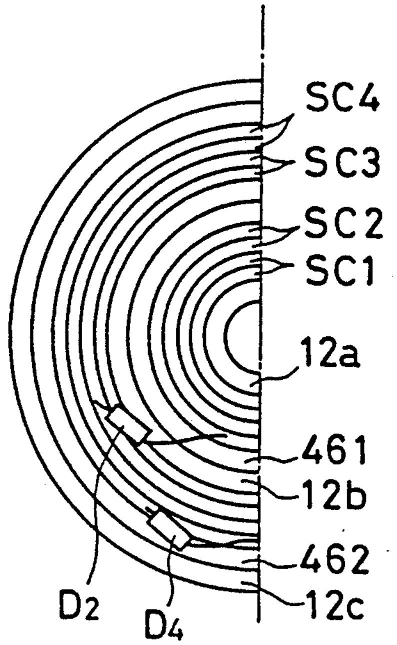

As shown in FIG. 14A and FIG. 14B, first, the film wound unit 12*a* is prepared. The secondary coils SC1 and SC2 are sequentially disposed on the film wound unit 12*a* in a laminated fashion. As the secondary coils SC1 and SC2, the metal plating coils 30 as shown in FIG. 9A and FIG. 9B can be utilized. Then, on the secondary coils SC1 and SC2, the film wound unit 12*b* is formed via an insulation sheet 461 on which the secondary coils SC3 and SC4 are further disposed in a laminated fashion. On the secondary coils SC3 and SC4, the film wound unit 12*c* is wound via an insulation sheet 462.

In this embodiment shown, each of the secondary coils SC1 through SC4 is formed by two metal plating coils. Therefore, each of the secondary coils SC1 and SC4 has a form in which two coils are connected in parallel to each other, as shown in FIG. 13. By using such a parallel connection of two coils for each of the secondary coils, it is possible to lower the direct current resistance of the secondary coils SC1 through SC4 so as to make the current capacity large. In addition, it is possible to keep a transformer going even if one of the metal plating coils which are connected in parallel to each other is broken down.

In the flyback transformer 10 thus constructed, by commonly connecting the first terminals 24*a*1, 24*a*2 and 24*a*3 shown in FIG. 13 to each other, commonly connecting the first terminals 24*b*1, 24*b*2 and 24*b*3 to each other, and connecting the second terminals 281, 282 and 283 to the first terminals 24*a*1, 24*a*2 and 24*a*3, respectively, the three primary coils PC1, PC2 and PC3 are connected in parallel to each other and thus three resonance capacitors Cp1, Cp2 and Cp3 are also connected in parallel to each other. In this case, the current capacity of each of the primary coils PC1, PC2 and PC3 may be ⅓ of that of the previous embodiment.

In this embodiment, since the secondary coils SC1 and SC2 are sandwiched by the film wound units 12*a* and 12*b* and the secondary coils SC3 and SC4 are sandwiched by the film wound units 12*b* and 12*c*, the leakage magnetic flux from the secondary coils SC1 through SC4 can be reduced, and thus, it is possible to make the secondary leakage inductance even smaller. Therefore, in this embodiment, the voltage regulation is further improved as shown by a line C in FIG. 15.

In the previous embodiments, as a primary coil, a film wound unit which incorporates a primary coil and a resonance capacitor is utilized. However, as in a conventional flyback transformer, the resonance capacitor may be constituted by a discrete component, and the secondary coil may be a, wire winding as in the conventional flyback transformer.

Furthermore, it is possible to change the way in which the plurality of primary coils are connected. For example, in the embodiment shown in FIG. 11, the resonance capacitor Cp1 may be omitted and the primary coils PC1 and PC2 may be connected to each other in a series fashion, and in the embodiment shown in FIG. 13, the resonance capacitors Cp2 and Cp3 may be omitted and the primary coils PC1, PC2 and PC3 may be connected to each other in a serial fashion.

Figure 16A:
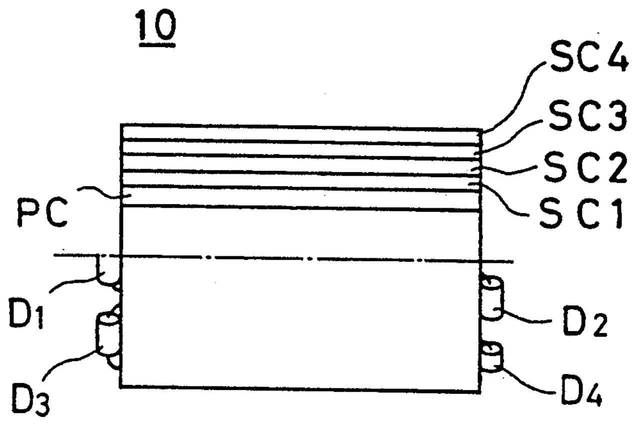
Figure 16B:
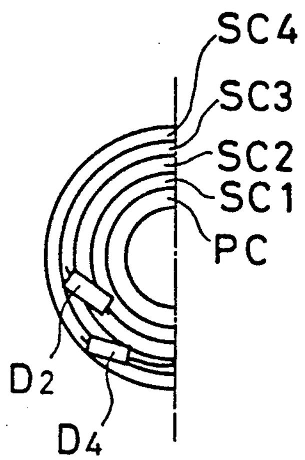
Figure 17A:
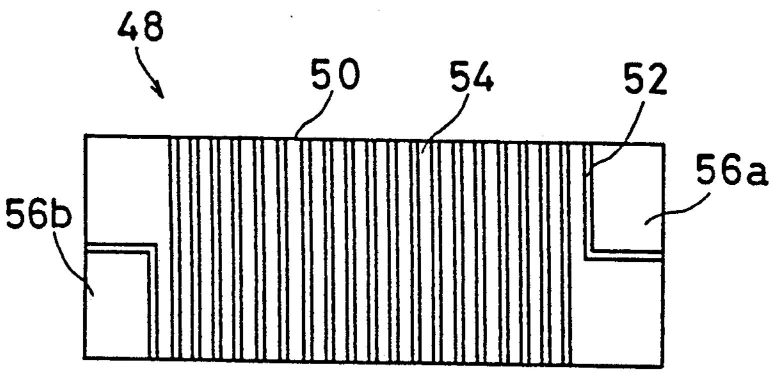
Figure 17B:
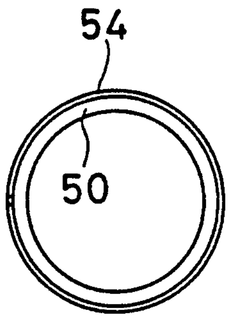

In the following embodiment, a metal plating coil is utilized as a primary coil. With reference to FIG. 16A and FIG. 16B, a flyback transformer 10 of this embodiment includes a primary coil PC and secondary coils SC1 through SC4 which are disposed on the primary coil PC. As the primary coil PC, preferably, a metal plating coil 48 as shown in FIG. 17A and FIG. 17B is utilized. Similarly to the metal plating coil 30 (FIG. 9A, FIG. 9B and FIG. 10) which is utilized as a secondary coil in the previous embodiment, the metal plating coil 48 includes a hollow insulation bobbin 50 formed by an insulation resin, and a spiral conductor 54 having a 3-layered structure is formed on the outer peripheral surface of the insulation bobbin 50 by means of a spiral groove 52.

Then, on the primary coil PC which is composed of the above described metal plating coil 48, the secondary coils SC1 through SC4 are sequentially disposed in a laminated fashion. As these secondary coils SC1 through SC4, as in the previous embodiment, the metal plating coils 30 can be utilized. More specifically, by preparing 4 kinds of the metal plating coils 30, having bobbin diameters which are different from each other, and by inserting the metal plating coils 30 on the primary coil PC, the flyback transformer 10 as shown in FIG. 16A and FIG. 16B is obtainable.

Then, as shown in FIG. 16A and FIG. 16B, the rectifying diodes D1 through D4 are connected between the respective secondary coils SC1 through SC4 by utilizing above described connecting terminals 56*a* and 56*b*.

In the flyback transformer 10 thus obtained, since the insulation bobbin 50 is inserted between the respective layers of the coils, it is possible to surely prevent a short-circuit from occurring. In addition, the conductor 54 which is formed on the outer peripheral surface of the insulation bobbin 50 is regularly formed with constant intervals betweens its turns by means of a laser, etc. Therefore, no short-circuits occur between the turns of the conductor 54 and thus the reliability thereof increases.

Figure 18:
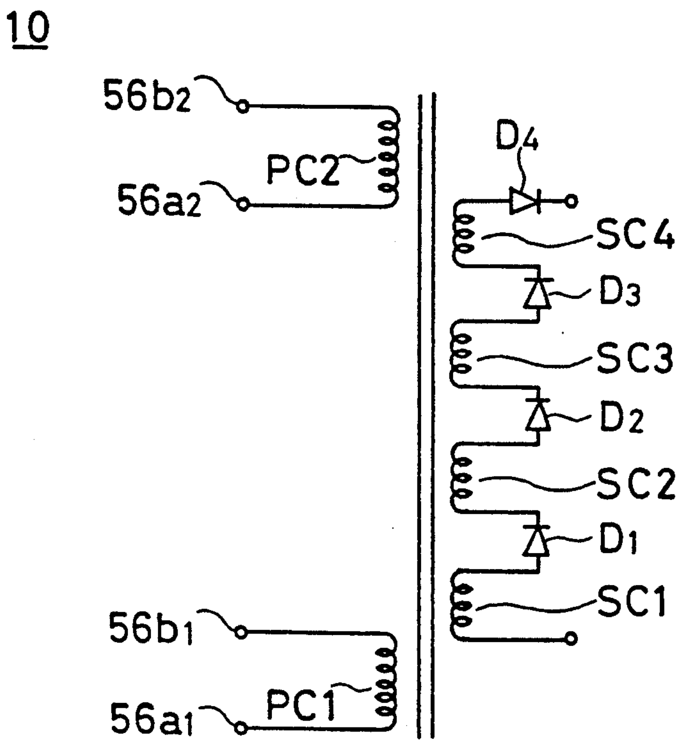
FIG. 18 is a circuit diagram showing a flyback transformer of a still further embodiment in accordance with the present invention.
Figure 19A:
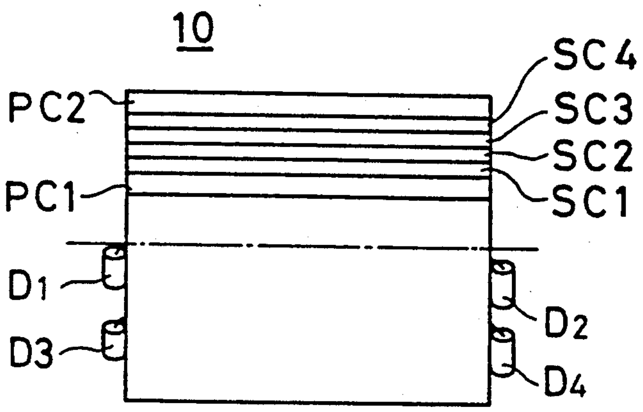
Figure 19B:
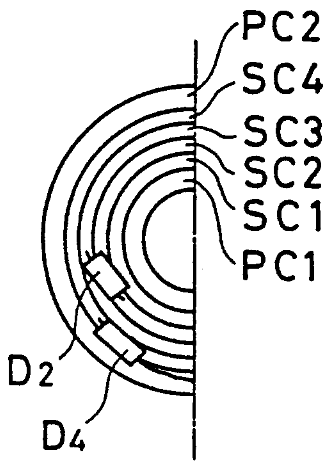

Next, with reference to FIG. 18, FIG. 19A and FIG. 19B, a flyback transformer 10 of this embodiment includes first and second primary coils PC1 and PC2, and secondary coils SC1 through SC4 which are disposed to be sandwiched by the first and second primary coils PC1 and PC2. More specifically, the secondary coils SC1 through SC4 are sequentially disposed on the first primary coil PC1 in a laminated fashion. Thereafter, the second primary coil PC2 is disposed on the uppermost secondary coil SC4 in a laminated fashion.

Since the metal plating coils 48 and 30 can be utilized as the first and second primary coils PC1 ,and PC2 and the secondary coils SC1 through SC4, a duplicative detailed description thereof will be omitted here.

In this flyback transformer 10, by connecting the connecting terminals 56*a*1 and 56*a*2 shown in FIG. 18 to each other and by connecting the connecting terminals 56*b*1 and 56*b*2 to each other, the two primary coils PC1 and PC2 are connected in parallel to each other.

In the embodiment shown in FIG. 18, FIG. 19A and FIG. 19B, since the primary coils SC1 through SC4 are sandwiched by the first and second primary coils PC1 and PC2, magnetic coupling between the primary coils PC1 and PC2 and the secondary coils SC1 through SC4 becomes close. Therefore, it is possible to reduce the secondary leakage magnetic flux, that is, secondary leakage inductance. In comparison with the conventional flyback transformer having the same size, the secondary leakage inductance can be reduced to 1/5–1/10. Therefore, in this embodiment, as shown by the line B in FIG. 15, it is possible to improve the voltage regulation.

Figure 20:
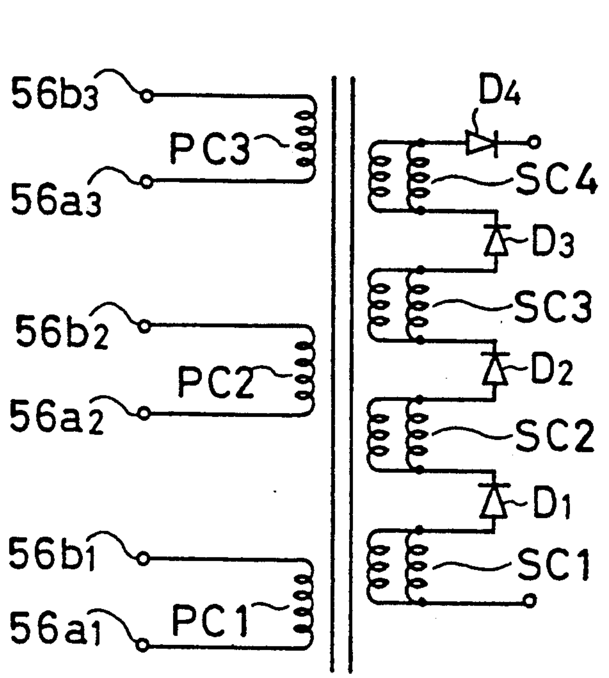
FIG. 20 is a circuit, diagram showing a flyback transformer of still another embodiment in accordance with the present invention.
Figure 21A:
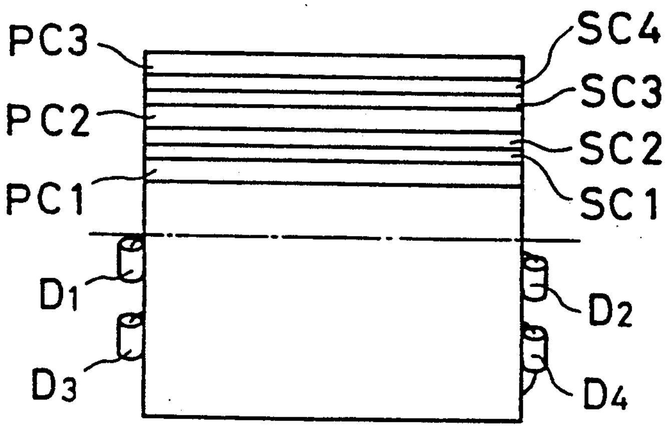
Figure 21B:
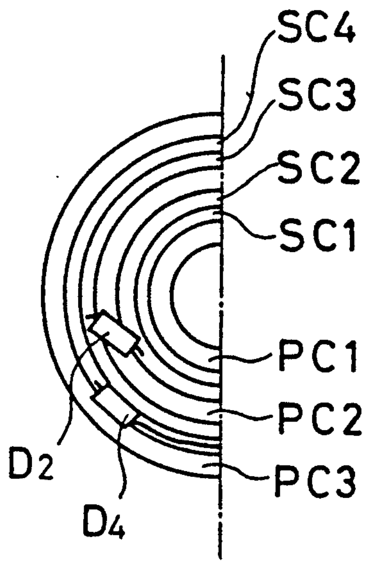

Lastly, with reference to FIG. 20, FIG. 21A and FIG. 21B, a flyback transformer 10 of this embodiment includes first, second and third primary coils PC1, PC2 and PC3 which sandwich secondary coils SC1 through SC4, respectively.

More specifically, as shown in FIG. 21A and FIG. 21B, at first, the secondary coils SC1 and SC2 are sequentially disposed on the first primary coil PC1, the second primary coil PC2 is disposed on the secondary coil SC2, the secondary coils SC3 and SC4 are sequentially disposed on the second primary coil PC2, and the third primary coil PC3 is disposed on the secondary coil SC4.

As the first, second and third primary coils PC1, PC2 and PC3 and the secondary coils SC1 through SC4, the metal plating coils 48 and 30 can be utilized. In addition, in this embodiment shown, each of the secondary coils SC1 through SC4 is formed by two metal plating coils 30. Therefore, each of the secondary coils SC1 through SC4 has a form in which two coils are connected in parallel to each other as shown in FIG. 20.

In the flyback transformer 10, by commonly connecting the connecting terminals 56*a*1, 56*a*2 and 56*a*3 shown in FIG. 20 to each other, and by commonly connecting the connecting terminals 56*b*1, 56*b*2 and 56*b*3 to each other, the first, second and third primary coils PC1, PC2 and PC3 are connected in parallel to each other.

In the embodiment, since the secondary coils SC1 and SC2 are sandwiched between the first and second primary coil PC1 and PC2 and the secondary coils SC3 and SC4 are sandwiched between the second and third primary coils PC2 and PC3, it is possible to further reduce the leakage magnetic flux from the secondary coils SC1 through SC4, that is, secondary leakage inductance, and therefore, such secondary leakage inductance can be reduced to approximately 1/20–1/30 in comparison with a conventional flyback transformer having the same size. Therefore, in the embodiment, the voltage regulation is improved as shown by a line C in FIG. 15.

In addition, in the above described embodiment shown in FIG. 18, FIG. 19A and FIG. 19B, the embodiment shown in FIG. 20, FIG. 21A and FIG. 21B, and so on, the secondary coils may be connected to each other in a series fashion.

In addition, a flyback transformer may have a structure in which the four secondary coils are each individually sandwiched between the respective primary coils one by one by disposing five primary coils in a laminated fashion.

In addition, by reversing a connecting direction of the rectifying diodes D1 through D4, the divided secondary coil may be disposed such that the inner side thereof is at a high voltage and the outer side thereof is at a low voltage.

Furthermore, if the metal plating coils 48 and 30 are utilized as the primary coil(s) and the secondary coils as in the above described embodiments, there is a tendency for the stray capacitance to increase; however, by suitably designing the material and the size of the insulation bobbin, it is possible to relatively freely arrange for higher harmonic tuning of the respective coils and thus it is possible to attempt to increase efficiency by freely using such higher harmonic tuning.

In addition, if a material such as polybutadiene having a small dielectric constant is impregnated in the material of the insulation bobbins 32 and 50, it is possible to prevent the above described stray capacitance from increasing. A material to be impregnated may be an epoxy resin, a phenol resin or the like and, a gas such as $SF_6$ may be contained.

In addition, in the metal plating coils 30 and 48, the conductors 34 and 54 may be formed on the inner peripheral surface of the insulation bobbins 32 and 50.

In addition, it is possible to utilize any material such as a resin, oil, gas or the like as an outer insulation member of the flyback transformer.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A flyback transformer, comprising:

a first wound unit which comprises a second insulation sheet wound and laminated on a first insulation sheet, said first wound unit including a first conductor which is formed on one surface of said first insulation sheet and extended in a longitudinal direction thereof, two first terminals which are fixed to said first conductor, a second conductor which is formed on one surface of said second insulation sheet, and a second terminal which is fixed to said second conductor;

a first primary coil being formed by said first conductor between said two first terminals and a first resonance capacitor which is connected to said primary coil being formed between said first and second conductors, said first resonance capacitor and said primary coil forming a resonance circuit having a predetermined resonance frequency; and a secondary coil which is disposed on said first wound unit.

2. A flyback transformer, comprising:

a first wound unit which comprises a second insulation sheet wound and laminated on a first insulation sheet, said first wound unit including a first conductor which is formed on one surface of said first insulation sheet and extended in a longitudinal direction thereof, two first terminals which are fixed to said first conductor, a second conductor which is formed on one surface of said second insulation sheet, and a second terminal which is fixed to said second conductor;

a first primary coil being formed by said first conductor between said two first terminals and a first resonance capacitor which is connected to said primary coil being formed between said first and second conductors; and a secondary coil which is disposed on said first wound unit;

wherein said secondary coil includes a metal plating coil which comprises an insulation bobbin and a conductor formed on a surface of said insulation bobbin.

3. A flyback transformer in accordance with claim 2, wherein said conductor of said metal plating coil has a three-layered structure.

4. A flyback transformer in accordance with claim 3, wherein said three-layered includes a non-electrolytic plating layer of nickel, an electrolytic plating layer of copper and an electrolytic plating layer of chromium laminated on said bobbin in that order.

5. A flyback transformer in accordance with claim 2, further comprising at least one additional secondary coil which includes a metal plating coil having an insulation bobbin and a conductor formed on a surface of said insulation bobbin; and said additional secondary coil closely surrounds the first-mentioned secondary coil.

6. A flyback transformer, comprising:

a first wound unit which comprises a second insulation sheet wound and laminated on a first insulation sheet, said first wound unit including a first conductor which is formed on one surface of said first insulation sheet and extended in a longitudinal direction thereof, two first terminals which are fixed to said first conductor, a second conductor which is formed on one surface of said second insulation sheet, and a second terminal which is fixed to said second conductor;

a first primary coil being formed by said first conductor between said two first terminals and a first resonance capacitor which is connected to said primary coil being formed between said first and second conductors; and a secondary coil which is disposed on said first wound unit; and further comprising a second wound unit which is disposed on said secondary coil and wound in a state where a second insulation sheet is laminated on a first insulation sheet, said second wound unit including a first conductor which is formed on one surface of said first insulation sheet to be extended in a longitudinal direction thereof, two first terminals which are fixed to said first conductor, a second conductor which is formed don one surface of said second insulation sheet, and a second terminal which is fixed to said second conductor, and a second primary coil being formed by said first conductor between said first terminals and a second resonance capacitor which is connected to said second primary coil being formed between said first and second conductors.

7. A flyback transformer in accordance with claim 3, wherein said secondary coil includes a metal plating coil which comprises an insulation bobbin and a conductor formed on a surface of said insulation bobbin.

8. A flyback transformer in accordance with claim 7, wherein said conductor of said metal plating coil has a three-layered structure.

9. A flyback transformer in accordance with claim 8, wherein said three-layered includes a non-electrolytic plating layer of nickel, an electrolytic plating layer of copper and an electrolytic plating layer of chromium laminated on said bobbin in that order.

10. A flyback transformer in accordance with claim 7, further comprising at least one additional secondary coil which includes a metal plating coil having an insulation bobbin and a conductor formed on a surface of said insulation bobbin; and said additional secondary coil closely surrounds the first-mentioned secondary coil.

11. A horizontal deflection circuit, comprising in combination a flyback transformer in accordance with claim 1, and a horizontal pulse generation circuit which includes a resonance capacitor connected to said primary coil of said flyback transformer, said resonance capacitor of said horizontal pulse generation circuit being constituted by said first resonance capacitor of said flyback transformer.

12. A horizontal deflection circuit in accordance with claim 11, wherein said first resonance capacitor is connected in parallel with said primary coil of said flyback transformer.

* * * * *